F. DEAN.
Hand-Seeder.
No. 48,528.  Patented July 4, 1865.
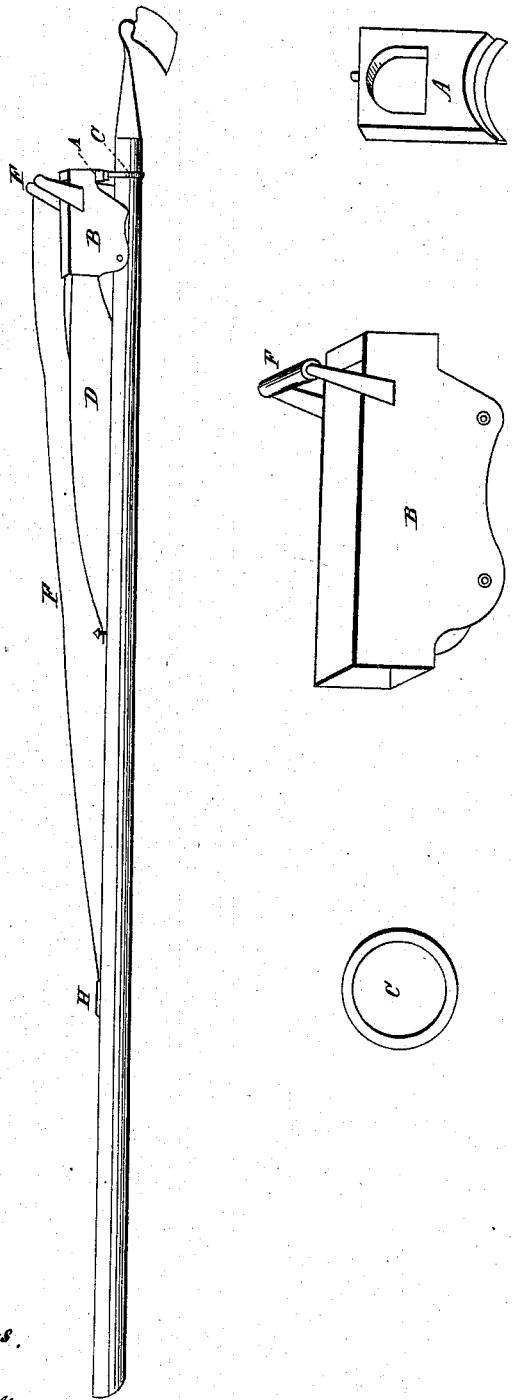
Witnesses.
D. W. C. Curtis
Bernard O'null
Inventor:
Frank Dean

UNITED STATES PATENT OFFICE.

FRANK DEAN, OF BELOIT, WISCONSIN.

IMPROVEMENT IN CORN-PLANTERS.

Specification forming part of Letters Patent No. 48,528, dated July 4, 1865.

*To all whom it may concern:*

Be it known that I, FRANK DEAN, of Beloit, in the county of Rock, in the State of Wisconsin, have invented a new and useful Machine for Planting Corn to be known as the "Ohio Corn-Planter;" and I do hereby declare that the following is a full, clear, and exact description of the construction and operation of the same.

This machine consists of an elongated box attached to the handle of a common hoe on the upper side of the handle, near the blade, and lengthwise of the handle. As a continuation of said box, and extending up the handle is a bag to contain and feed the machine with corn. At the lower end of said box, which is the end toward the blade of the hoe, there is a small sliding box with only four sides, and which will contain corn for one hill. The lower end of said sliding-box rests on the handle of the hoe, and from thence extends entirely through the lower end of the first-mentioned box. Directly over said sliding box, and attached to the first-mentioned box, is a roller. Fastened to said sliding box is a string, which passes over the roller and runs up the handle through a staple and is fastened to a ring. Said ring lies on the handle and is grasped by the lower hand when the hoe is held in its natural position. The lower end of the sliding box, which is the end resting on the hoe-handle, is connected with an elastic band which encircles the hoe-handle.

The manner of operating this machine is to grasp the hoe in the usual manner, and thereby grasp the ring, strike the hoe into the ground, and remove sufficient soil to cover one hill the width of the blade. Then, letting the hoe partially rest on the ground, slide the ring up with said hand, which will have the effect to slide up said sliding box and drop the corn therein contained into the spot from whence the soil was removed, during which time a flange extending from said sliding box prevents the corn from running into the place previously occupied by said sliding box, and by sliding the said ring down with said hand the elastic band immediately draws the sliding box to its former position. Thus it only requires the sliding of said ring up and down to drop the corn, and the soil which remains on the hoe can be replaced and cover the corn.

What I claim as my invention, and desire to secure by Letters Patent, is—

The slide A, in combination with the rollers F, cone E, and ring H, arranged and operating substantially as described.

FRANK DEAN.

Witnesses:
R. H. MILLS,
R. TATTERSHALL.